United States Patent
Gandhi et al.

(10) Patent No.: US 12,185,407 B2
(45) Date of Patent: Dec. 31, 2024

(54) PROVIDING ADAPTIVE TRANSITION BETWEEN AN INACTIVE STATE AND AN IDLE STATE

(71) Applicant: Cisco Technology, Inc., San Jose, CA (US)

(72) Inventors: Indermeet Singh Gandhi, San Jose, CA (US); Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 416 days.

(21) Appl. No.: 17/661,978

(22) Filed: May 4, 2022

(65) Prior Publication Data

US 2023/0363039 A1    Nov. 9, 2023

(51) Int. Cl.
*H04W 76/27* (2018.01)
*H04W 72/1263* (2023.01)

(52) U.S. Cl.
CPC ....... *H04W 76/27* (2018.02); *H04W 72/1263* (2013.01)

(58) Field of Classification Search
CPC .......................... H04W 76/27; H04W 72/1263
See application file for complete search history.

(56) References Cited

U.S. PATENT DOCUMENTS

| | | | |
|---|---|---|---|
| 2019/0082417 A1 | 3/2019 | Bolle et al. | |
| 2020/0178343 A1 | 6/2020 | Kim et al. | |
| 2020/0323020 A1 | 10/2020 | Liu | |
| 2020/0351763 A1 | 11/2020 | Wang et al. | |
| 2021/0112621 A1* | 4/2021 | Dong | H04W 76/38 |
| 2021/0185755 A1 | 6/2021 | Kim et al. | |
| 2021/0219264 A1 | 7/2021 | Chen et al. | |
| 2021/0259041 A1* | 8/2021 | Dong | H04W 76/38 |
| 2021/0337481 A1* | 10/2021 | Goel | H04W 52/0229 |
| 2022/0256369 A1* | 8/2022 | Tugnawat | H04W 24/06 |

* cited by examiner

*Primary Examiner* — Michael A Keller
(74) *Attorney, Agent, or Firm* — Merchant & Gould P.C.

(57) ABSTRACT

Adaptive transition between an inactive state and an idle state may be provided. An end node device may be configured with an end node device upper threshold. Next, it may be determined that that client devices are inactive preferred. Then the client devices determined to be inactive preferred may be assigned to a Radio Resource Control (RRC) inactive state and to the end node device. One or more of the client devices previously assigned to the RRC inactive state may be assigned to an RRC idle state and to an intermediate device until a number of the client devices assigned to the end node device is less than or equal to the end node device upper threshold.

20 Claims, 3 Drawing Sheets

PROVIDING ADAPTIVE TRANSITION BETWEEN AN INACTIVE STATE AND AN IDLE STATE

TECHNICAL FIELD

The present disclosure relates generally to providing adaptive transition between an inactive state and an idle state.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
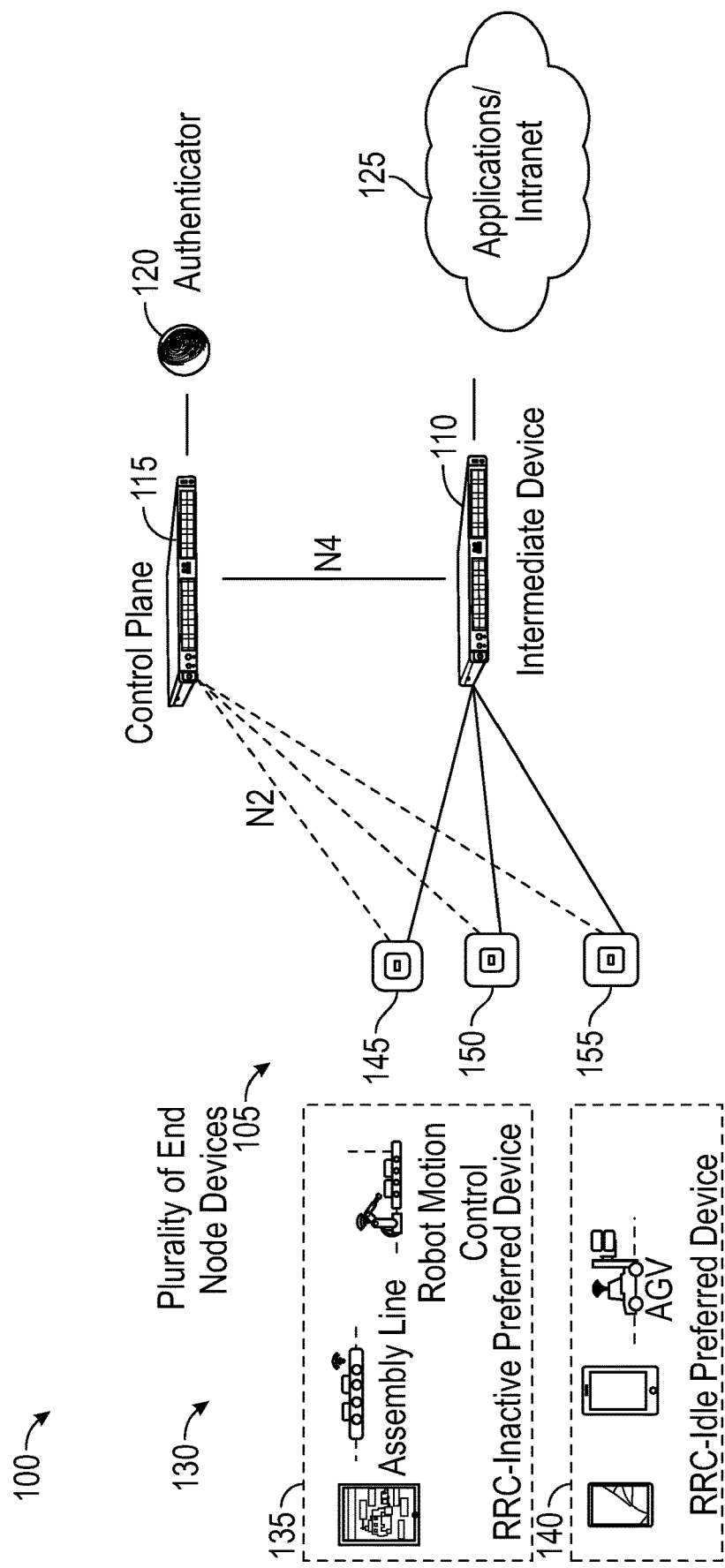
FIG. 1 is a block diagram of an operating environment for providing adaptive transition between an inactive state and an idle state.

Adaptive transition between an inactive state and an idle state may be provided. An end node device may be configured with an end node device upper threshold. Next, it may be determined that that client devices are inactive preferred. Then the client devices determined to be inactive preferred may be assigned to a Radio Resource Control (RRC) inactive state and to the end node device. One or more of the client devices previously assigned to the RRC inactive state may be assigned to an RRC idle state and to an intermediate device until a number of the client devices assigned to the end node device is less than or equal to the end node device upper threshold.

Both the foregoing overview, and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In Long-Term Evolution (LTE) broadband cellular networks and 4G broadband cellular networks, User Equipment (UE) state may comprise Radio Resource Control (RRC) idle and RRC connected. In the RRC idle state, UE context is not maintained in the Radio Access Network (RAN). As a result, when Down Link (DL) data comes for the UE, the core network (e.g., the Package Gateway) may buffer the DL data and the Mobility Management Entity (MME) may trigger a paging message.

5G broadband cellular networks introduce a new intermediate state called RRC inactive where UE context may be maintained in the RAN (e.g., gNB). A benefit of keeping the UE context (and hence, the security context) in a gNB may be that the transition to RRC connected may be faster. In addition, in the RRC inactive state, the paging responsibility lies with the gNB that buffers data for the UE and takes the processing load to page UEs in the cells corresponding to the RNA (RAN-based Notification Area).

RRC inactive may be an improvement for UE devices that have frequent data to send to the network and thus, the connection time may be improved as UE context may be in the gNB. However, a disadvantage of RRC inactive may be that it introduces a need for buffering DL data at the gNB with the gNB taking the processing load to initiate paging. This may increase the buffering requirement on the gNB and thus the cost. In addition, the scope of the RNA where a gNB may page may be limited and when the UE moves out of the RNA, it may need to signal the network regarding this move. While in the case of the RRC idle state, the UE may move across a much wider area without informing the network.

There may be benefits for both the RRC idle state and the RRC inactive state to exist in the network. The 3GPP standard may not prescribe under what condition one state may be chosen over the another. Embodiments of the disclosure may exploit the two aforementioned states in a favorable way because the UE's characteristics (e.g., mobility pattern, frequency of sending data, etc.) as well the buffer capacity of gNBs and User Plane Function (UPF) devices may be known. For example, some gNBs may serve between 64 UEs and 256 UEs depending on the deployed model. In other words, different models of gNB may have different compute and memory capacity.

Even when a particular paging mode may be chosen for a UE, there may be a need for a capability in the network to adaptively offload the UE from one paging type (e.g., UPF or gNB) depending on load conditions at the gNB or the UPF. Accordingly, embodiments of the disclosure may provide an adaptive technique to move UEs in a network between different paging and buffering modes (e.g., gNB or at UPF) depending on load conditions at the gNB or the UPF.

FIG. 1 is a block diagram of an operating environment for providing adaptive transition between an inactive state and an idle state. As shown in FIG. 1, operating environment 100 may comprise a plurality of end node devices 105, an intermediate device 110, a control plane 115, an authenticator 120, applications/intranet 125, and plurality of client devices 130 (e.g., UE). Plurality of client devices 130 may comprise, for example, a plurality of Radio Resource Control (RRC) inactive preferred devices 135 and plurality of RCC idle preferred devices 140. Plurality of end node devices 105 may comprise a first end node device 145, a second end node device 150, and a third end node device 155. Intermediate device 110 may comprise a User Plane Function (UPF) device.

Ones of plurality of end node devices 105 may comprise devices that may be connected to a cellular network that may communicate directly and wirelessly with client devices (e.g., plurality of RCC inactive preferred devices 135 and plurality of RCC idle preferred devices 140) to provide access to applications/intranet 125. For example, ones of plurality of end node devices 105 may comprise, but are not limited to, an eNodeB (eNB) or a gNodeB (gNB). The aforementioned cellular network may comprise, but is not limited to, a Long-Term Evolution (LTE) broadband cellular network, a 4G broadband cellular network, or a 5G broadband cellular network, operated by a service provider.

Ones of plurality of client devices 130 may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), an Automatic Guided Vehicle (AGV), a Virtual reality (VR)/Augmented reality (AR) device, or other similar microcomputer-based device.

Authenticator 120 may perform digital authentication of plurality of client devices 130. Based, for example, on client device characteristics (e.g., mobility pattern, frequency of sending data, etc.) received from authenticator 120, plurality of client devices 130 may be segregated into plurality of RCC inactive preferred devices 135 and plurality of RCC idle preferred devices 140. For example, less mobile devices like stationary robots and assembly line devices may be RCC inactive preferred. More mobile devices such as ATVs, drones, UAVs, and AGV may be considered RRC idle preferred devices.

The elements described above of operating environment 100 (e.g., ones of plurality of end node devices 105, intermediate device 110, control plane 115, authenticator 120, and ones of plurality of client devices 130) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
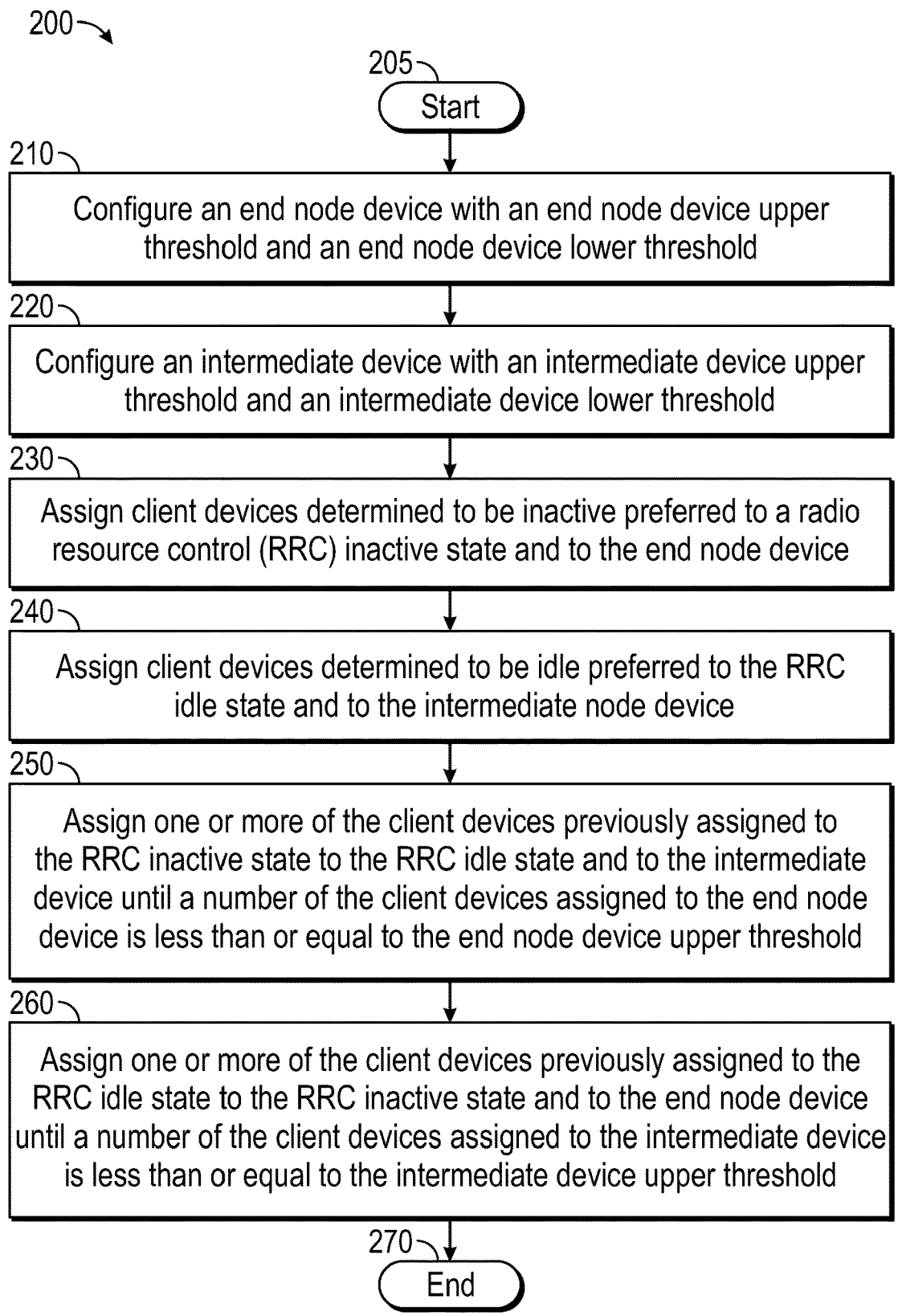
FIG. 2 is a flow chart of a method for providing adaptive transition between an inactive state and an idle state.

FIG. 2 is a flow chart setting forth the general stages involved in a method 200 consistent with an embodiment of the disclosure for providing adaptive transition between an inactive state and an idle state. Method 200 may be implemented using elements of operating environment 100 as described in more detail above with respect to FIG. 1. Ways to implement the stages of method 200 will be described in greater detail below.

Method 200 may begin at starting block 205 and proceed to stage 210 where control plane 115 may configure an end node device (e.g., first end node device 145) with an end node device upper threshold and an end node device lower threshold. For example, control plane 115 may provide both the end node device upper threshold and the end node device lower threshold (e.g., during setup of the RAN) to first end node device 145, second end node device 150, and third end node device 155. The end node device upper threshold may comprise the number of client devices that an end node device (e.g., gNB) may server before it is considered to be saturated and should not serve any new client devices. The end node device lower threshold may comprise the number of client devices that an end node device (e.g., gNB) may server below which it is considered to be able to take on new client devices.

From stage 210, where control plane 115 configures an end node device (e.g., first end node device 145) with the end node device upper threshold and the end node device lower threshold, method 200 may advance to stage 220 where control plane 115 may configure intermediate device 110 (e.g. UPF device) with an intermediate device upper threshold and an intermediate device lower threshold. For example, control plane 115 may provide both the intermediate device upper threshold and the intermediate device lower threshold (e.g., during setup of the RAN) to the intermediate device 110. The intermediate device upper threshold may comprise the number of client devices that intermediate device 110 (e.g., UPF device) may server before it is considered to be saturated and should not serve any new client devices. The intermediate device lower threshold may comprise the number of client devices that intermediate device 110 (e.g., UPF device) may server below which it is considered to be able to take on new client devices.

Once control plane 115 configures intermediate device 110 with the intermediate device upper threshold and the intermediate device lower threshold in stage 220, method 200 may continue to stage 230 where control plane 115 may assign client devices determined to be inactive preferred to a Radio Resource Control (RRC) inactive state and to the end node device (e.g. first end node device 145). For example, based on client device characteristics (e.g., mobility pattern, frequency of sending data, etc.) received from authenticator 120, plurality of client devices 130 may be segregated into plurality of RCC inactive preferred devices 135 and plurality of RCC idle preferred devices 140. For example, less mobile devices such as stationary robots and assembly line devices may be RCC inactive preferred.

After control plane 115 assigns client devices determined to be inactive preferred to RRC inactive state and to the end node device (e.g. first end node device 145) in stage 230, method 200 may proceed to stage 240 where control plane 115 may assign client devices determined to be idle preferred to the RRC idle state and to intermediate device 110 (e.g., UPF device). For example, based on client device characteristics (e.g., mobility pattern, frequency of sending data, etc.) received from authenticator 120, plurality of client devices 130 may be segregated into plurality of RCC inactive preferred devices 135 and plurality of RCC idle preferred devices 140. More mobile devices such as ATVs, drones, UAVs, and AGV may be considered RRC idle preferred devices.

Once control plane 115 assigns client devices determined to be idle preferred to the RRC idle state and to intermediate device 110 (e.g., UPF device) in stage 240, method 200 may continue to stage 250 where control plane 115 may assign one or more of the client devices previously assigned to the RRC inactive state to the RRC idle state and to intermediate device 110 (e.g., UPF device) until a number of the client devices assigned to the end node device (e.g., first end node device 145) is less than or equal to the end node device upper threshold. For example, embodiments of the disclosure may make adaptive mode (i.e., state) changes for client devices initially assigned to RRC inactive. For client devices in the RRC inactive state, the end node device (i.e., a gNB) may buffer DL data to be sent to a client device and may perform paging of the client device.

When first end node device 145's buffer exceeds the end node device upper threshold, first end node device 145 may report this to control plane 115 using, for example, a Next Generation (NG) Radio Access Network (RAN) configuration update. Control plane 115 may acknowledge first end node device 145 to remove the client device context (i.e., move the client device to RCC idle). First end node device 145 may then perform RRC release for the client device. Control plane 115 may then send an N4 session modification request to intermediate device 110 to start buffering DL data for the client device. Now, any DL data may be buffered at intermediate device 110 and paging may be initiated by control plane 115 and not by first end node device 145. Any new client registration may be assigned RRC idle while the buffer at first end node device 145 remains at or above the end node device upper threshold. When the buffer at first end node device 145 goes below the end node device lower threshold and is reported in an NG RAN configuration update, control plane 115 may request first end node device 145 to move connected client devices to RRC inactive after timer expiry.

After control plane 115 assigns one or more of the client devices previously assigned to the RRC inactive state to the RRC idle state and to intermediate device 110 (e.g., UPF device) until a number of the client devices assigned to the end node device (e.g., first end node device 145) is less than or equal to the end node device upper threshold in stage 250, method 200 may proceed to stage 260 where control plane 115 may assign one or more of the client devices previously assigned to the RRC idle state to the RRC inactive state and to the end node device (first end node device 145) until a number of the client devices assigned to intermediate device 110 (e.g., UPF device) is less than or equal to the intermediate device upper threshold. For example, embodiments of the disclosure may make adaptive mode (i.e., state) changes for client devices initially assigned to RRC idle. For client devices in the RRC idle state, intermediate device 110 (e.g., UPF device) may buffer DL data to be sent to a client device and control plane 115 may perform paging of the client device.

When intermediate device 110's buffer exceeds the intermediate device upper threshold, intermediate device 110 may report this to control plane 115 using Packet Forwarding Control Protocol (PFCP) overload for example. Control plane 115 may send a client device context modification for the client device that may need to move to the RRC inactive state. Also, control plane 115 may send an N4 session modification request for intermediate device 110 to stop buffering DL data for the client device. First end node device 145 may move the client device to RRC inactive from the RCC connected state after inactivity timer expiry. New client device registrations may be assigned RRC inactive as the preferred mode while the buffer at intermediate device 110 remains at or above the intermediate device upper threshold.

When the buffer at intermediate device 110 goes below the intermediate device lower threshold and is reported using PFCP overload, control plane 115 may request first end node device 145 to move connected client devices to RRC idle after timer expiry for intermediate device 110 to start buffering DL data and control plane 115 to perform paging. Once control plane 115 assigns one or more of the client devices previously assigned to the RRC idle state to the RRC inactive state and to the end node device (e.g., first end node device 145) until a number of the client devices assigned to intermediate device 110 (e.g., UPF device) is less than or equal to the intermediate device upper threshold in stage 260, method 200 may then end at stage 270.

Figure 3:
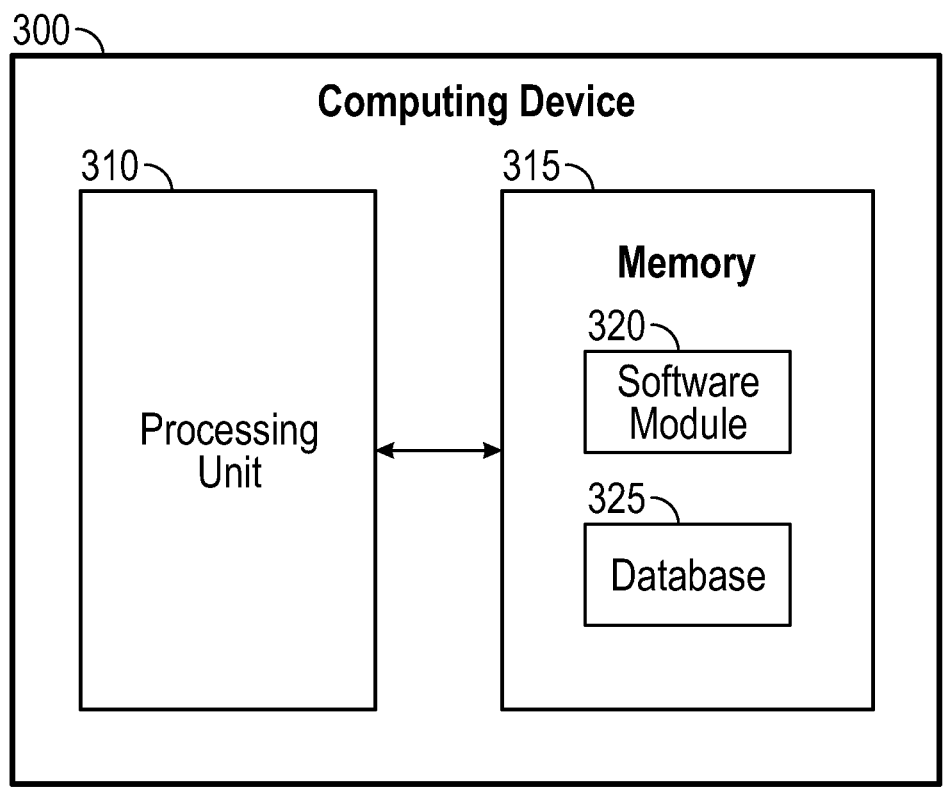
FIG. 3 is a block diagram of a computing device.

FIG. 3 shows a computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing adaptive transition between an inactive state and an idle state as described above with respect to FIG. 2. Computing device 300, for example, may provide an operating environment for the elements of FIG. 1. The elements of FIG. 1 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   configuring an end node device with an end node device upper threshold;
   determining that client devices are inactive preferred;
   assigning the client devices determined to be inactive preferred to a Radio Resource Control (RRC) inactive state and to the end node device; and
   assigning one or more of the client devices previously assigned to the RRC inactive state to an RRC idle state and to an intermediate device until a number of the client devices assigned to the end node device is less than or equal to the end node device upper threshold.

2. The method of claim 1, further comprising:
   configuring the end node device with an end node device lower threshold; and
   assigning one or more of the client devices previously assigned to the RRC idle state to the RRC inactive state and to the end node device when a number of the client devices assigned to the end node device is less than or equal to the end node device lower threshold.

3. The method of claim 1, wherein the end node device comprises a gNodeB (gNB).

4. The method of claim 1, wherein the intermediate device comprises a User Plane Function (UPF) device.

5. The method of claim 1, wherein determining that the client devices are inactive preferred comprises determining that the client devices are inactive preferred based on mobility patterns of the client devices.

6. The method of claim 1, wherein determining that the client devices are inactive preferred comprises determining that the client devices are inactive preferred based on data sending frequency of the client devices.

7. The method of claim 1, wherein determining that the client devices are inactive preferred comprises using information received about the client device during authentication.

8. A method comprising:
   configuring an intermediate device with an intermediate device upper threshold;
   determining that client devices are idle preferred;
   assigning the client devices determined to be idle preferred to a Radio Resource Control (RRC) idle state and to the intermediate device; and
   assigning one or more of the client devices previously assigned to the RRC idle state to an RRC inactive state and to an end node device until a number of the client devices assigned to intermediate device is less than or equal to the intermediate device upper threshold.

9. The method of claim 8, further comprising:
configuring the intermediate device with an intermediate device lower threshold; and
assigning one or more of the client devices previously assigned to the RRC inactive state to the RRC idle state and to the intermediate device when a number of the client devices assigned to the intermediate device is less than or equal to the intermediate device lower threshold.

10. The method of claim 8, wherein the end node device comprises a gNodeB (gNB).

11. The method of claim 8, wherein the intermediate device comprises a User Plane Function (UPF) device.

12. The method of claim 8, wherein determining that the client devices are idle preferred comprises determining that the client devices are idle preferred based on mobility patterns of the client devices.

13. The method of claim 8, wherein determining that the client devices are idle preferred comprises determining that the client devices are idle preferred based on data sending frequency of the client devices.

14. The method of claim 8, wherein determining that the client devices are idle preferred comprises using information received about the client device during authentication.

15. A system comprising:
a memory storage; and
a processing unit disposed in an Access Point (AP), the processing unit coupled to the memory storage, wherein the processing unit is operative to:
configure an end node device with an end node device upper threshold;
determine that client devices are inactive preferred;
assign the client devices determined to be inactive preferred to a Radio Resource Control (RRC) inactive state and to the end node device; and
assign one or more of the client devices previously assigned to the RRC inactive state to an RRC idle state and to an intermediate device until a number of the client devices assigned to the end node device is less than or equal to the end node device upper threshold.

16. The system of claim 15, wherein the processing unit is further operative to:
configure the end node device with an end node device lower threshold; and
assign one or more of the client devices previously assigned to the RRC idle state to the RRC inactive state and to the end node device when a number of the client devices assigned to the end node device is less than or equal to the end node device lower threshold.

17. The system of claim 15, wherein the end node device comprises a gNodeB (gNB).

18. The system of claim 15, wherein the intermediate device comprises a User Plane Function (UPF) device.

19. The system of claim 15, wherein the processing being operative to determine that the client devices are inactive preferred comprises the processing being operative to determine that the client devices are inactive preferred based on mobility patterns of the client devices.

20. The system of claim 15, wherein the processing being operative to determine that the client devices are inactive preferred comprises the processing being operative to determine that the client devices are inactive preferred based on data sending frequency of the client devices.

* * * * *